US012792757B2

(12) United States Patent
Oe et al.

(10) Patent No.: US 12,792,757 B2
(45) Date of Patent: Nov. 10, 2026

(54) INFORMATION PROCESSING METHOD AND STORAGE MEDIUM

(71) Applicant: Humming Heads, Inc., Tokyo (JP)

(72) Inventors: Naoyuki Oe, Tokyo (JP); Takahiro Shima, Tokyo (JP)

(73) Assignee: Humming Heads, Inc., Tokyo (JP)

( * ) Notice: Subject to any disclaimer, the term of this patent is extended or adjusted under 35 U.S.C. 154(b) by 26 days.

(21) Appl. No.: 18/785,153

(22) Filed: Jul. 26, 2024

(65) Prior Publication Data

US 2024/0386126 A1 Nov. 21, 2024

Related U.S. Application Data

(63) Continuation of application No. PCT/JP2022/002902, filed on Jan. 26, 2022.

(51) Int. Cl.
*G06F 21/62* (2013.01)

(52) U.S. Cl.
CPC .. *G06F 21/6218* (2013.01); *G06F 2221/2141* (2013.01)

(58) Field of Classification Search
CPC ................. G06F 21/6218; G06F 21/62; G06F 2221/2141; H04L 63/105; H04L 63/107; H04L 63/20; H04W 12/088; H04W 12/61; H04W 12/63
See application file for complete search history.

(56) References Cited

U.S. PATENT DOCUMENTS 7,607,131 B2 * 10/2009 Oe ...................... G06F 21/6209 709/229
8,356,307 B2 1/2013 Oe et al.
8,504,706 B2 8/2013 Oe et al.
2008/0066148 A1 * 3/2008 Lim ...................... G06Q 10/10 726/1
2017/0063927 A1 * 3/2017 Schultz .................. H04L 63/10
2024/0171528 A1 * 5/2024 Oe ......................... G06F 21/53

FOREIGN PATENT DOCUMENTS

| | | | |
|---|---|---|---|
| JP | H01-209561 | A | 8/1989 |
| JP | 2003-044297 | A | 2/2003 |
| JP | 2006-053824 | A | 2/2006 |
| JP | 2011-175649 | A | 9/2011 |

OTHER PUBLICATIONS

Extended European Search Report dated Feb. 12, 2025 in counterpart European Patent Appln. No. 22923799.5.
International Search Report and Written Opinion issued on Apr. 19, 2022 in parent application PCT/JP2022/002902.

* cited by examiner

*Primary Examiner* — Han Yang
(74) *Attorney, Agent, or Firm* — Venable LLP

(57) ABSTRACT

An method for controlling access to a computer resource on a network resource from a communication apparatus is disclosed. the method comprises: selecting a policy suitable for a state of the communication apparatus with access privilege allowed for each one of a plurality of types of work defined as a policy for each work; obtaining information of a policy selected for the communication apparatus; capturing an operation request for the computer resource before the computer resource is accessed; determining whether or not there is access privilege for a computer resource specified by the operation request on a basis of information of the policy; and denying access to the computer resource specified by the operation request if a result of the determining is that there is no access privilege.

13 Claims, 16 Drawing Sheets

FIG. 3

ACCESS RIGHT MANAGEMENT TABLE

2035

| 20351 | 20352 | 20353 | | 2035n |
|---|---|---|---|---|
| RESOURCE DESIGNATION INFORMATION A | CONDITION A | ACCESS RIGHT INFORMATION A1 | ... | ACCESS RIGHT INFORMATION An |
| RESOURCE DESIGNATION INFORMATION B | CONDITION B | ACCESS RIGHT INFORMATION B1 | ... | ACCESS RIGHT INFORMATION Bn |
| RESOURCE DESIGNATION INFORMATION C | CONDITION C | ACCESS RIGHT INFORMATION C1 | ... | ACCESS RIGHT INFORMATION Cn |
| .... | ....... | ...... | ..... | ...... |

FIG. 6A

SEPARATION POLICY EXAMPLE

| SEPARATION POLICY | CONTROL INFORMATION | | | |
|---|---|---|---|---|
| | USABLE PROGRAMS | READABLE AREAS | WRITABLE AREAS | TEMPORARY ACCESS |
| FOR CONFIDENTIAL IN-COMPANY WORK | SCHEDULE MANAGEMENT APPLICATIONS;<br>DEVELOPMENT APPLICATIONS;<br>DOCUMENT CREATION APPLICATIONS;<br>BASICALLY ALL CAN BE USED | EXTERNAL HDD;<br>INTERNAL HDD;<br>SOURCE CODE AREA;<br>CHARACTER DATA AREA ETC.,<br>BASICALLY ALL CAN BE ACCESSED | EXTERNAL HDD; INTERNAL HDD;<br>SOURCE CODE AREA;<br>CHARACTER DATA AREA;<br>SCHEDULE AREA ETC., BASICALLY ALL CAN BE WRITTEN | NOT FUNCTIONAL |
| FOR IN-COMPANY OFFICE WORK | OFFICE WORK PROGRAMS;<br>SCHEDULE MANAGEMENT APPLICATIONS;<br>EMAIL;<br>DOCUMENT CREATION APPLICATIONS | INTERNAL HDD;<br>CHARACTER DATA AREA;<br>SCHEDULE AREA;<br>NETWORK | INTERNAL HDD;<br>CHARACTER DATA AREA;<br>SCHEDULE AREA | NOT FUNCTIONAL |
| FOR REMOTE WORK AT HOME | DOCUMENT CREATION APPLICATIONS;<br>EMAIL | INTERNAL HDD;<br>CHARACTER DATA AREA;<br>VPN TO COMPANY NETWORK | COMPANY STORAGE;<br>CHARACTER DATA | VALID |
| FOR BUSINESS TRIP WORK | BROWSER ONLY;<br>EMAIL | ONLY DOCUMENTS INPUTTED INTO USB | WRITE NOT ALLOWED | VALID |
| FOR UNREGISTERED LOCATIONS | NOT USABLE | NOT USABLE | WRITE NOT ALLOWED | ACCESS NOT ALLOWED |
| PREDETERMINED SEPARATION POLICY | OFFICE WORK PROGRAMS;<br>EMAIL DOCUMENT CREATION APPLICATIONS | INTERNAL HDD;<br>CHARACTER DATA AREA;<br>NETWORK | INTERNAL HDD CHARACTER DATA | VALID |

FIG. 6B

| SEPARATION POLICY | APPLICATION TARGET | | | | PROCESSING TO CLEAR |
|---|---|---|---|---|---|
| | TERMINAL INFORMATION | USER INFORMATION | POSITION INFORMATION | TIME INFORMATION | |
| FOR CONFIDENTIAL IN-COMPANY WORK | RESTRICT TO CERTAIN REGISTERED TERMINALS | PEOPLE REGISTERED FOR EACH POLICY | CERTAIN AREAS IN COMPANY | BASICALLY ALLOWED AT ANY TIME WORK HOURS AND NON-WORK HOURS | LEAVE UNCHANGED |
| FOR IN-COMPANY OFFICE WORK | REGISTERED TERMINALS | PEOPLE REGISTERED FOR EACH POLICY | REGISTERED AREAS IN COMPANY | WORK HOURS | CLEAR CLIPBOARD |
| FOR REMOTE WORK AT HOME | REGISTERED MOBILE TERMINALS | PEOPLE REGISTERED FOR EACH POLICY | HOME OF REGISTERED EMPLOYEE | BASICALLY ALLOWED AT ANY TIME | CLEAR CLIPBOARD; CLEAR TEMPORARY ACCESS |
| FOR BUSINESS TRIP WORK | REGISTERED MOBILE TERMINALS | PEOPLE REGISTERED FOR EACH POLICY | REGISTERED TRIP DESTINATION | TIME AT REGISTERED BUSINESS TRIP DESTINATION | CLEAR CLIPBOARD |
| FOR UNREGISTERED LOCATIONS | REGISTERED MOBILE TERMINALS | NONE | NONE | NONE | NONE |
| PREDETERMINED SEPARATION POLICY | REGISTERED TERMINALS | PEOPLE REGISTERED FOR EACH POLICY | WITHIN COMPANY | WORK HOURS | CLEAR CLIPBOARD |

FIG. 9A

| SEPARATION POLICY NAME | SEPARATION ENVIRONMENT IMPLEMENTED BY SEPARATION OF NETWORK RESOURCE |
|---|---|
| FOR IN-COMPANY CONFIDENTIAL TASK A | ENVIRONMENT IN WHICH, TO WORKER OF TASK A,<br>PATH TO INTERNET DOES NOT EXIST AND<br>ON FILE SERVER ONLY DATA REGION FOR TASK A EXISTS |
| FOR IN-COMPANY CONFIDENTIAL TASK B | ENVIRONMENT IN WHICH,<br>TO WORKER OF COMPANY B,<br>PATH TO INTERNET DOES NOT EXIST AND<br>ON FILE SERVER ONLY DATA REGION FOR TASK B EXISTS |
| WATERMARK PRINTING | ENVIRONMENT IN WHICH,<br>TO DEDICATED TERMINAL FOR CREATING WATERMARK PRINT DOCUMENT,<br>IN-COMPANY FILE SERVER AND<br>PRINTER HAVING WATERMARK FUNCTION EXIST<br>AND OTHER PRINTERS DO NOT EXIST |
| CLOUD RESTRICTION | ENVIRONMENT IN WHICH,<br>TO TERMINAL USED IN COMPANY,<br>TEAMS AND OUTLOOK CLOUD SERVICES CAN BE USED,<br>BUT OTHER INTERNET ACCESS IS BLOCKED |
| CLOUD RESTRICTION (APPLICATION RESTRICTION) | ENVIRONMENT IN WHICH ACCESS-PERMITTED APPLICATION IS RESTRICTED BY "CLOUD RESTRICTION" POLICY |

FIG. 9B-1

| SEPARATION POLICY NAME | CONTROL INFORMATION | APPLICATION TARGET | NETWORK RESOURCE CONTROL INFORMATION |
|---|---|---|---|

| SEPARATION POLICY NAME | TERMINAL INFORMATION | USER INFORMATION | POSITION INFORMATION | TIME INFORMATION |
|---|---|---|---|---|
| FOR IN-COMPANY CONFIDENTIAL TASK A | RESTRICTION TO PORTION OF REGISTERED TERMINALS | PEOPLE REGISTERED FOR EACH POLICY | AREA OF PORTION WITHIN COMPANY | WORK HOURS AND OUTSIDE OF WORK HOURS (ALLOWED ANY TIME) |
| FOR IN-COMPANY CONFIDENTIAL TASK B | SAME AS ABOVE | SAME AS ABOVE | SAME AS ABOVE | SAME AS ABOVE |
| WATERMARK PRINTING | SAME AS ABOVE | SAME AS ABOVE | SAME AS ABOVE | WITHIN WORK HOURS |
| CLOUD RESTRICTION | SAME AS ABOVE | SAME AS ABOVE | WITHIN COMPANY OR REGISTERED HOME | AVAILABLE ANY TIME |
| CLOUD RESTRICTION (APPLICATION RESTRICTION) | SAME AS ABOVE | SAME AS ABOVE | WITHIN COMPANY OR REGISTERED HOME | AVAILABLE ANY TIME |

TO FIG.9B-2

FIG. 9B-2

FROM FIG.9B-1

| SEPARATION POLICY NAME | IP ADDRESS, HOST NAME | FILE SERVER, REMOTE DEVICE | URL |
|---|---|---|---|
| FOR IN-COMPANY CONFIDENTIAL TASK A | INTERNET PROXY: PROHIBITED<br>OTHER (SPECIFICALLY, WITHIN COMPANY): ALLOWED | ¥¥fileserver¥TASK_A¥<.*>: ALLOWED<br>OTHERWISE PROHIBITED | N/A |
| FOR IN-COMPANY CONFIDENTIAL TASK B | INTERNET PROXY: PROHIBITED<br>OTHER (SPECIFICALLY, WITHIN COMPANY): ALLOWED | ¥¥fileserver¥TASK_B¥<.*>: ALLOWED<br>OTHERWISE PROHIBITED | N/A |
| WATERMARK PRINTING | INTERNET PROXY: PROHIBITED<br>OTHER (SPECIFICALLY, WITHIN COMPANY): ALLOWED | ¥¥fileserver¥<.*>: PERMITTED<br>¥¥printerXXX: PERMITTED<br>OTHERWISE: PROHIBITED | N/A |
| CLOUD RESTRICTION | INTERNET PROXY: ALLOWED<br>OTHER (SPECIFICALLY IN-COMPANY) PROHIBITED | ALL PROHIBITED | https://teams.microsoft.com/<.*>: PERMITTED<br>https://outlook.office.com/<.*>:PERMITTED<br>OTHERWISE: PROHIBITED |
| CLOUD RESTRICTION (APPLICATION RESTRICTION) | INTERNET PROXY: ALLOWED<br>OTHER (SPECIFICALLY IN-COMPANY) PROHIBITED | ALL PROHIBITED | ON teams.exe, https://teams.microsoft.com/<.*>: PERMITTED<br>ON edge.exe, https://outlook.office.com/<.*>: PERMITTED<br>OTHERWISE: PROHIBITED |

INFORMATION PROCESSING METHOD AND STORAGE MEDIUM

CROSS-REFERENCE TO RELATED APPLICATION(S)

This application is a continuation of International Patent Application No. PCT/JP2022/002902 filed on Jan. 26, 2022, the entire disclosures of which is incorporated herein by reference.

BACKGROUND OF THE INVENTION

Field of the Invention

The present invention relates to an information processing method for controlling access to a network resource, and a storage medium.

Description of the Related Art

For work in a company or the like, it is typical for each person to be provided with a personal computer (hereinafter, referred to as a PC). In regards to security when using a PC, a known technique restricts operations involving a resource by a user with no access privilege to the computer resource while using an existing OS (operating system) and processes (PTL 1).

With increasing diversity in the work content performed in a company and the like, when PCs are used for work in a company and the like, for security reasons, it is becoming common to selectively use a plurality of PCs according to the work content. For example, when the same PC is used for a task involving in-company information of high confidentiality, a task using the Internet, or tasks performed when teleworking, there are concerns such as the risk of in-company information being leaked outside the company and the risk of being the target of a cyber attack. Thus, different PCs which have separate operation environments, such as storage areas and networks accessible or usable based on the work content, are used to carry out tasks. In practice, different operation environments separated per task are implemented using methods such as physically using a plurality of PCs and using VDI (virtual desktop infrastructure) or virtual PCs on one PC.

CITATION LIST

Patent Literature

PTL 1: Japanese Patent Laid-Open No. 2011-175649

However, preparing physical or virtual PCs separated per work content increases the resources (PCs and the OS and other software) that need to be managed, the complexity involved in using a plurality of PCs, and various costs and the like. A plausible solution includes physically separating access terminals using known virtual technology to selectively use the physically existing network resources per user and work content. However, this requires many virtual machines to be prepared for sufficient separation. Also, for example, in the case of separating a file server, there is a method including preparing a plurality of user accounts according to the work and separating them for use at the login stage. However, this makes user management complicated. In either case, user-friendliness may be impaired, and the overall cost may be increased.

SUMMARY OF THE INVENTION

The present invention is made in light of the issues described above and an object of the present invention is to realize access control that is expanded according to the use status of a worker for network resources that can be used by the worker.

In order to solve the aforementioned issues, one aspect of the present disclosure provides an information processing method for controlling access to a computer resource on a network resource from a communication apparatus used by a user, comprising: selecting a policy suitable for a state of the communication apparatus from a plurality of policies with access privilege allowed for each one of a plurality of types of work defined as a policy for each work; and in the network resource, obtaining information of a policy selected for the communication apparatus; capturing an operation request from a process or an operating system for the computer resource on the network resource before the computer resource is accessed, in a case where an access request for a computer resource on the network resource is received from the communication apparatus; determining whether or not there is access privilege for a computer resource specified by the operation request captured in the capturing on a basis of information of the policy obtained in the obtaining; executing processing to send the operation request as is to an operating system if a result of the determining is that there is an access privilege and send the result back to a request source; and denying access to the computer resource specified by the operation request if a result of the determining is that there is no access privilege.

Another aspect of the present disclosure provides a non-transitory computer-readable storage medium storing one or more programs for causing one or more computers to execute an information processing method for controlling access to a computer resource on a network resource from a communication apparatus used by a user, the information processing method comprising: selecting a policy suitable for a state of the communication apparatus from a plurality of policies with access privilege allowed for each one of a plurality of types of work defined as a policy for each work; and in the network resource, obtaining information of a policy selected for the communication apparatus; capturing an operation request from a process or an operating system for the computer resource on the network resource before the computer resource is accessed, in a case where an access request for a computer resource on the network resource is received from the communication apparatus; determining whether or not there is access privilege for a computer resource specified by the operation request captured on a basis of information of the policy obtained in the obtaining step; executing processing to send the operation request as is to an operating system if a result of the determining is that there is an access privilege and send the result back to a request source; and denying access to the computer resource specified by the operation request if a result of the determining is that there is no access privilege.

The present invention enables realization of access control that is expanded according to the use status of a worker for network resources that can be used by the worker, while using an existing OS or process of a terminal or a device on a network.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a diagram illustrating an example of the data configuration of an access privilege management table for facilitating description of the API capture technique according to an embodiment.

FIG. 6A is a diagram (1) illustrating an example of a separation policy according to an embodiment.

FIG. 6B is a diagram (2) illustrating an example of a separation policy according to an embodiment.

FIG. 9A is a diagram (1) for describing an example of separation policies for separating a network resource according to an embodiment of the present invention.

FIG. 9B-1 is a diagram (2-1) for describing an example of separation policies for separating a network resource according to an embodiment of the present invention.

FIG. 9B-2 is a diagram (2-2) for describing an example of separation policies for separating a network resource according to an embodiment of the present invention.

DESCRIPTION OF THE EMBODIMENTS

Figure 1A:
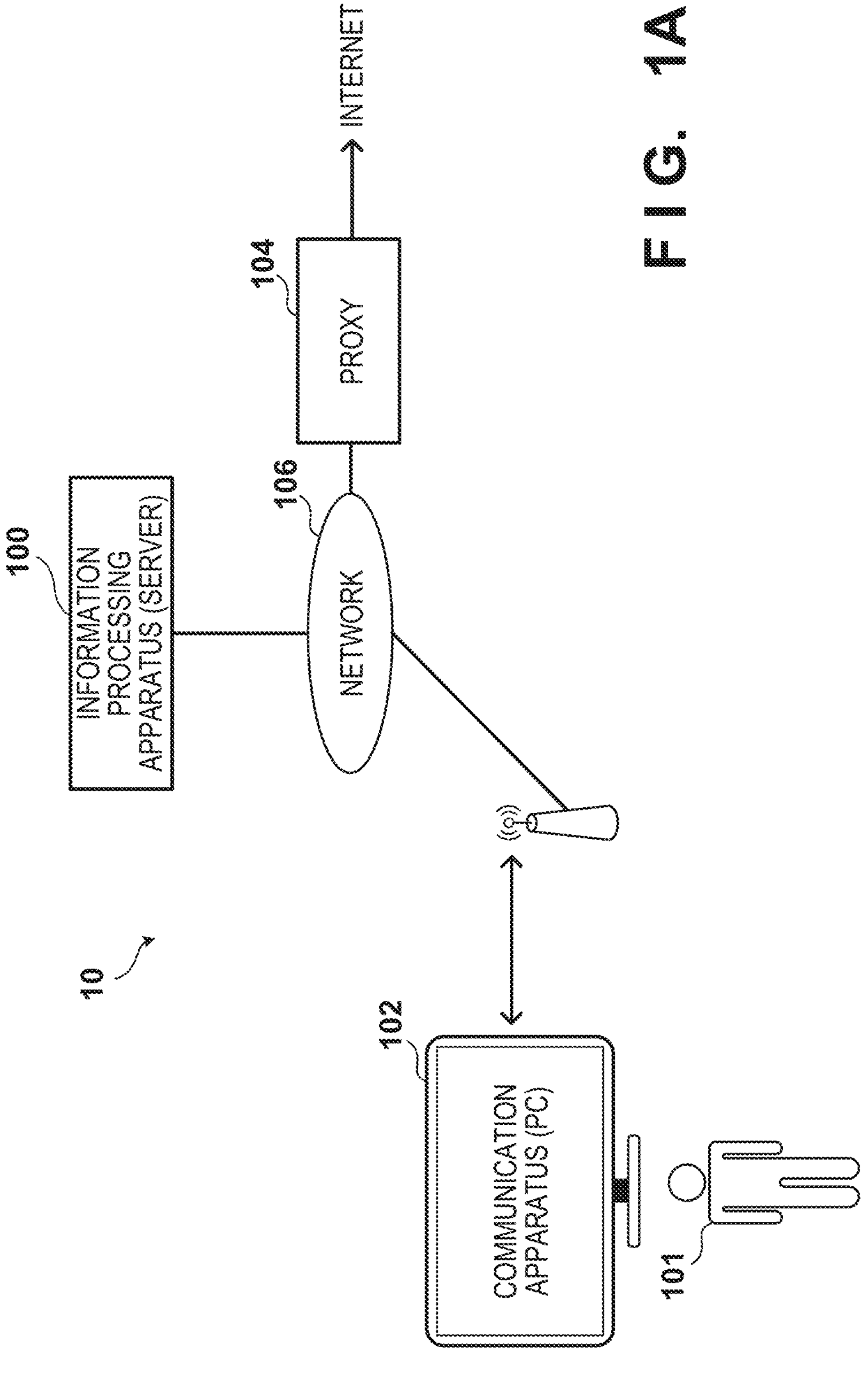
FIG. 1A is a diagram illustrating an example of the configuration of an access control system according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Configuration of Access Control System

The configuration of an access control system 10 according to the present embodiment will now be described with reference to FIG. 1A. The access control system 10 includes a server 100 and a personal computer (PC) 102. The access control system 10 may further include a proxy 104. The server 100 and the PC 102 can communicate via a network 106. For communication, the PC 102 may be connected to the Internet, for example, via the proxy 104 as necessary. The PC 102 is an example of a communication apparatus. However, the communication apparatus may be another terminal such as a tablet terminal or a smartphone. The PC 102 provides a user 101 appropriate access to the internal resources and network resources. The controlling server 100 is an example of an information processing apparatus and, for example, runs a file server for storing in-company file data. The proxy 104 is an example of a communication apparatus and, for example, operates as a proxy server that controls access when the PC 102 accesses the Internet.

Example of Functional Configuration of PC

Figure 1B:
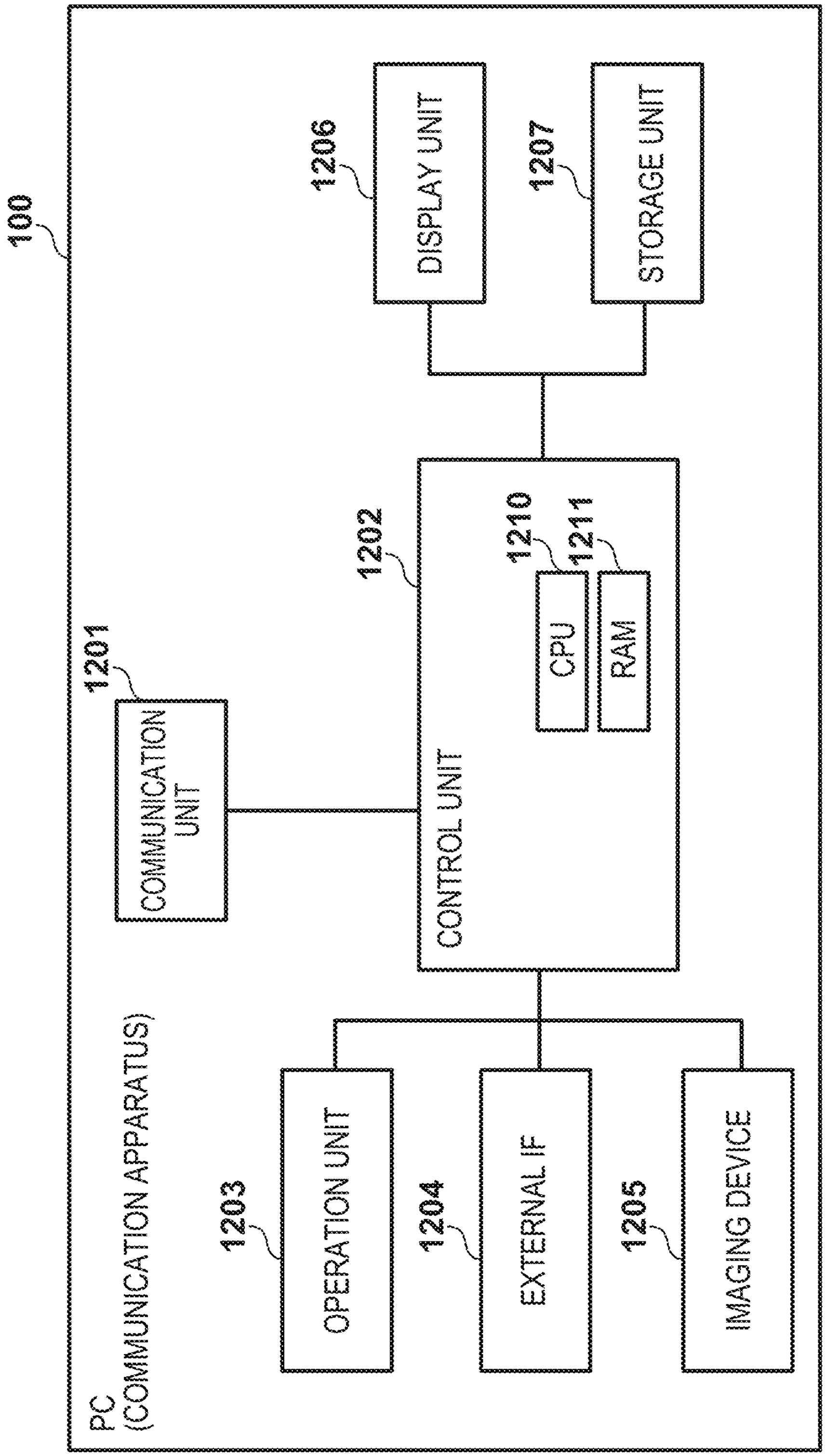
FIG. 1B is a diagram illustrating an example of the functional configuration of a PC according to an embodiment of the present invention.

An example of the functional configuration of the PC 102 will now be described with reference to FIG. 1B. The configuration illustrated in FIG. 1B illustrates the functional blocks forming a personal computer, which is an example of a communication apparatus according to the present embodiment. Note that each of the functional blocks described below may be integrated or separated, and the functions described below may be implemented by a different block. Also, a hardware configuration described below may be implemented by software and vice versa.

A communication unit 1201 includes a communication circuit and the like, for example, and accesses the server 100 and the Internet via wireless communication such as via wireless LAN to exchange the necessary data. A control unit 1202 includes a CPU 1210 and RAM 1211. The control unit 1202 controls the operations of each unit in the PC 102 by loading a computer program stored in a storage unit 1207 onto the RAM 1211 and the CPU 1210 executing the computer program. Also, the control unit 1202 controls access via input via an operation unit 1203 or the like to the internal resources of the PC 102 and the network resources external to the PC.

The operation unit 1203 may include an input apparatus such as a keyboard, mouse, touch panel, and the like of the PC 102 and accepts an operation of a GUI for various types of operations displayed on a display unit 1206. An external IF 1204 is an interface between a predetermined device such as a printer and the PC 102. An imaging device 1205 is a camera device including an image sensor, for example, that captures images in response to instruction from the control unit 1202. The display unit 1206 includes an LCD, OLED or similar display device, for example, and displays a GUI for operation, data successfully accessed by the user, and the like.

The storage unit 1207 includes a non-volatile memory (non-volatile storage medium) such as a semiconductor memory or the like and stores computer programs executed by the control unit 1202, setting values, and the like. Data such as files created for company work and the like are also stored here. The computer program stored in the storage unit 1207 includes an operating system for implementing the various functions of the PC 102, various applications, and programs for executing various types of processing such as the access control program described below.

Configuration of Server

Figure 1C:
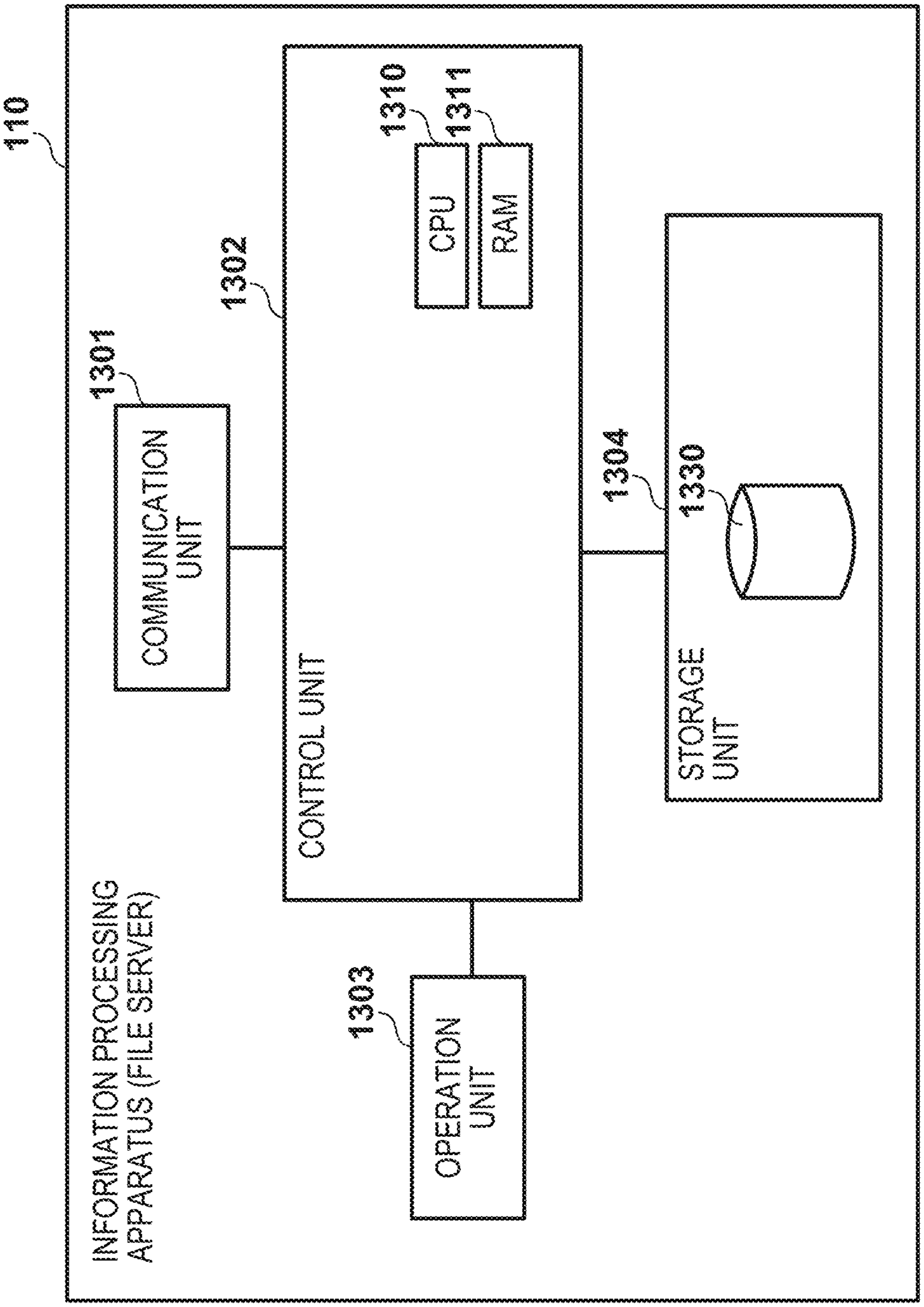
FIG. 1C is a diagram illustrating an example of the functional configuration of a server according to an embodiment of the present invention.

Next, an example of the functional configuration of the server 100 will be described with reference to FIG. 1C. Note that each of the functional blocks described below may be integrated or separated, and the functions described below may be implemented by a different block. Also, a hardware configuration described below may be implemented by software and vice versa.

A communication unit 1301 includes a communication circuit for communicating with the PC 102 via the network. Information processed by a control unit 1302 is transmitted to the PC 102, and information processed by the control unit 1302 is received from the PC 102.

The control unit 1302 includes a CPU 1310 and RAM 1311. The CPU 1310 is a central processing unit. The control unit 1302 implements each function of the server 100 by loading a computer program stored in a storage unit 1304 onto the RAM 1311 and executing the computer program using the CPU 1310. The RAM 1311 includes a volatile storage medium such as DRAM, for example, and temporarily stores parameters, processing results, and the like for the control unit 1302 to execute computer programs.

The storage unit 1304 includes a non-volatile storage medium such as a hard disk, semiconductor memory, of the like and stores setting values and computer programs required to the operations of the server 100. Also, the storage unit 1304 stores, in a database 1330, the data of various files relating to work that are uploaded form the PC 102. The computer program stored in the storage unit 1304 includes an operating system for implementing the various functions of the server 100, various applications, and programs for executing various types of processing such as the access control program described below. An operation unit 1303 is an operation mechanism that enables operation of the server 100 either directly or remotely. The operation unit 1303 includes a mouse and the keyboard as well as a component for receiving operation instruction from an external apparatus via communication. For example, the administrator of the server 100 uses the operation unit 1303 to perform various operations including setting the required settings and inputting the required information.

Before describing separation of a network resource according to the present embodiment, two techniques for implementing the present embodiment, namely an API capture technique and a separation policy application technique, will be described.

API Capture Technique

First, the API capture technique will be described. In the present embodiment, the API capture technique is applied to a terminal (for example, a PC) used by a user and a file server or network device (network resource) on a network, for example. To facilitate a more general description of the API capture technique, in the following example, the API capture technique is applied to a typical electronic device (for example, a PC). Note that it should be clear to one skilled in the art that the API capture technique described below can be applied in a substantially similar manner between each OS of a file server and a network device and an application.

Typically, for an application to access the resources managed by the OS, the API (application program interface) provided by the OS is used. The method for using the API is set by the OS, and an executable code portion that uses the API can be determined. In the present invention, a monitoring routine for monitoring all APIs required to access the resource is provided, and, before an application uses the API, the executable code portion is changed or the entrance of API processing entrance is substituted with the monitoring routine such that the monitoring routine is used when the API is used. The monitoring routine processes the API required by the application, or returns a result to the application as an illegal command without executing the API processing. The access privilege extended by the resource management program of the present invention is managed by this program independently of management of the OS, and a monitoring routine is provided for each type of access privilege. With this method, access from an application that illicitly uses resources is restricted from that application.

Specifically, the resource management program interposed between the application and the operating system, before accessing a computer resource of an operation request from an application specified for accessing the computer resource, monitors and captures the operation request for a specified computer resource from among operation requests issued by the application. Also, whether or not to allow access to the computer resource specified by the captured operation request is determined on the basis of a separation policy, which is a collection of the computer access privileges described below, to control access.

Figure 2:
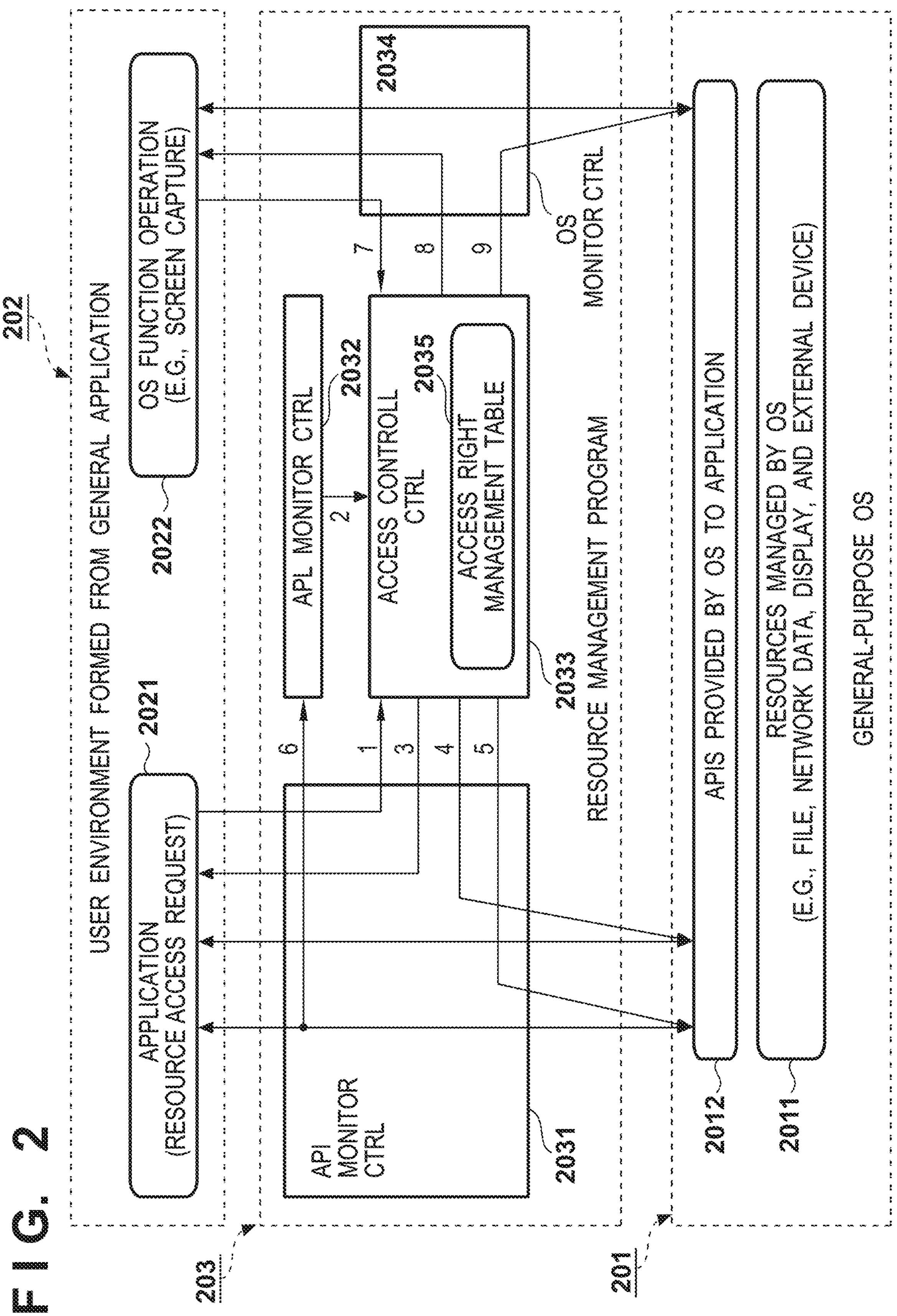
FIG. 2 is a diagram illustrating the relationship between the functional configuration of a resource management program and an OS and an application for facilitating description of an API capture technique according to an embodiment.

FIG. 2 is a diagram schematically illustrating API monitoring/controlling and the configuration of a resource management program 203 according to the present invention. The resource management program 203 includes an API monitoring controller (API monitoring CTRL) 2031, an APL (application) monitoring controller (APL monitoring CTRL) 2032, an access control controller (access control CTRL) 2033, and an OS monitoring controller (OS monitoring CTRL) 2034.

The resource management program 203 is located between a user environment 202 constituted by a typical application which includes an application 2021 for sending a resource access request and an OS function operation 2022 such as a screen capture and a general-purpose OS 201. The resource management program 203 is configured to monitor requests for resources provided by the general-purpose OS 201 and the user environment 202.

Note that the general-purpose OS 201 includes a resource 2011 managed by the OS and an API group 2012 provided by the OS to the application 2021.

The API monitoring CTRL 2031 in the resource management program 203 according to the present invention is a module for monitoring all APIs required for performing access control. Also, the APL monitoring CTRL 2032 is a module for storing resources held by the application 2021. The access control CTRL 2033 is a module for determining whether or not to allow access to the resource 2011 and includes an access privilege management table 2035. Also, the OS monitoring CTRL 2034 is a module for monitoring the operations to access the resource via the function of the general-purpose OS 201.

As illustrated in FIG. 3, the access privilege management table 2035 is configured to be able to register resource specifying information 20351, a condition 20352, and n pieces of access privilege information 20353 to 2035*n* for each resource.

The resource specifying information 20351 is information for specifying a specific resource 2011 from among the resources 2011 managed by the general-purpose OS 201. In the case of a file, information such as a file name or a file ID is registered. In the case of an application, a program name is registered, for example. In the case of communication data, a host name, a port number, an IP address, or a Bluetooth identifier or Wi-Fi AP (access point) address is registered. In the case of memory, an object name indicating the object, an address, or the like is registered. Also, in the case of an external apparatus, a device name indicating the device driver or a unique identifier called device ID is registered, for example.

The condition 20352 indicates a condition for validating access privilege or a combination thereof. For example, a user name/ID, a group name/ID, time, or the like is registered.

The access privilege information 20353 to 2035*n* indicates, from among access privileges extended but not defined in an existing environment, a privilege added to the specified resource. For example, a privilege to move to another medium, a privilege to copy to another medium, a print privilege, a privilege to load to a shared memory (clipboard or the like in the case of Windows), screen capture privilege, usable application restrictions (prohibited to use outside of specified application, prohibited to attach to email), or the like are registered. Also, for resources involving reading and writing, each of these privileges can be registered. For example, writing to a specific USB memory may be not allowed but read may be allowed. In a case where writing is also allowed, writing using encryption can be specified, and the encryption key at this time is defined by the separation policy (separation policy will be described below in detail). Only a separation policy with the same encryption key can read the information. Thus, the information that can be essentially referenced can be separated on a separation policy basis. Such specifications can be made for resources having writing privilege such as files, USB devices, clipboard, and the like. Communication resources have reading (receiving) and writing (transmitting) information as well as connecting and accepting information.

Note that typically, access to a resource may be performed via a plurality of APIs. The resource specifying information in this case is converted to an ID (handle or the like) managed by the OS. In this case, inside the resource management program 203, the resource specifying information and the ID are equated with one another.

The processing of the resource management program 203 according to such a configuration will now be described following the information transfer process indicated by (1) to (9) (corresponding to the numbers 1 to 9 in the diagram) in FIG. 2.

(1) If there is an access request to a resource via an API issued by the application 2021, the API monitoring CTRL 2031 captures the request and transfers it to the access control CTRL 2033.

(2) The access control CTRL 2033 obtains, from the APL monitoring CTRL 2032, the information of the resource held by the application 2021 as necessary when an access privilege check is performed.

(3) There are two conditions for being denied access. With a first condition A (access denial A), in response to the access request of (1), the access privilege management table 2035 is referenced and an access privilege check for the resource is performed. In a case where the check result shows no privilege, an illegal access error is returned as the result without executing the API processing of the API issued by the application 2021 being performed.

(4) With a second condition B (access denial B), in response to the access request of (1), the access privilege management table 2035 is referenced and an access privilege check for the resource is performed. In a case where the check result shows no privilege and an error cannot be sent back as a result of the API {processing} issued by the application 2021, the access request is replaced with an access request for a dummy resource prepared in advance by the resource management program 203, and the API processing is executed without executing the processing for the resource requested by the application 2021.

As a result, the application 2021 runs as if the request succeeded, but actually, the requested resource cannot be accessed.

(5) In a case where the result of the access privilege check for the access request (1) shows a privilege, the API monitoring CTRL 2031 captures the access request, sends the API processing issued by the application 2021 as is to the general-purpose OS 201, and sends the result back to the application 2021.

(6) In a case where, via the processing of (5), API is successful and the application 2021 holds the resource via the API, it is sent to the APL monitoring CTRL 2032. The APL monitoring CTRL 2032 registers the association between the application 2021 and the held resource.

In a case where the application 2021 issues a resource release request API and the API is successful, this is sent to the APL monitoring CTRL 2032. The APL monitoring CTRL 2032 deletes the association between the application 2021 and the previously held resource.

(7) If there is an access request for a resource via the operation of the OS standard function, the OS monitoring CTRL 2034 captures the access request and sends it to the access control CTRL 2033.

(8) For the access request (7), the access privilege management table 2035 is referenced and an access privilege check for the resource is performed. In a case where the check result shows no privilege, the operation of (7) is ignored.

(9) For the access request (7), the access privilege management table 2035 is referenced and an access privilege check for the resource is performed. In a case where the check result shows a privilege, the operation of (7) is sent to the general-purpose OS 201.

Figure 4:
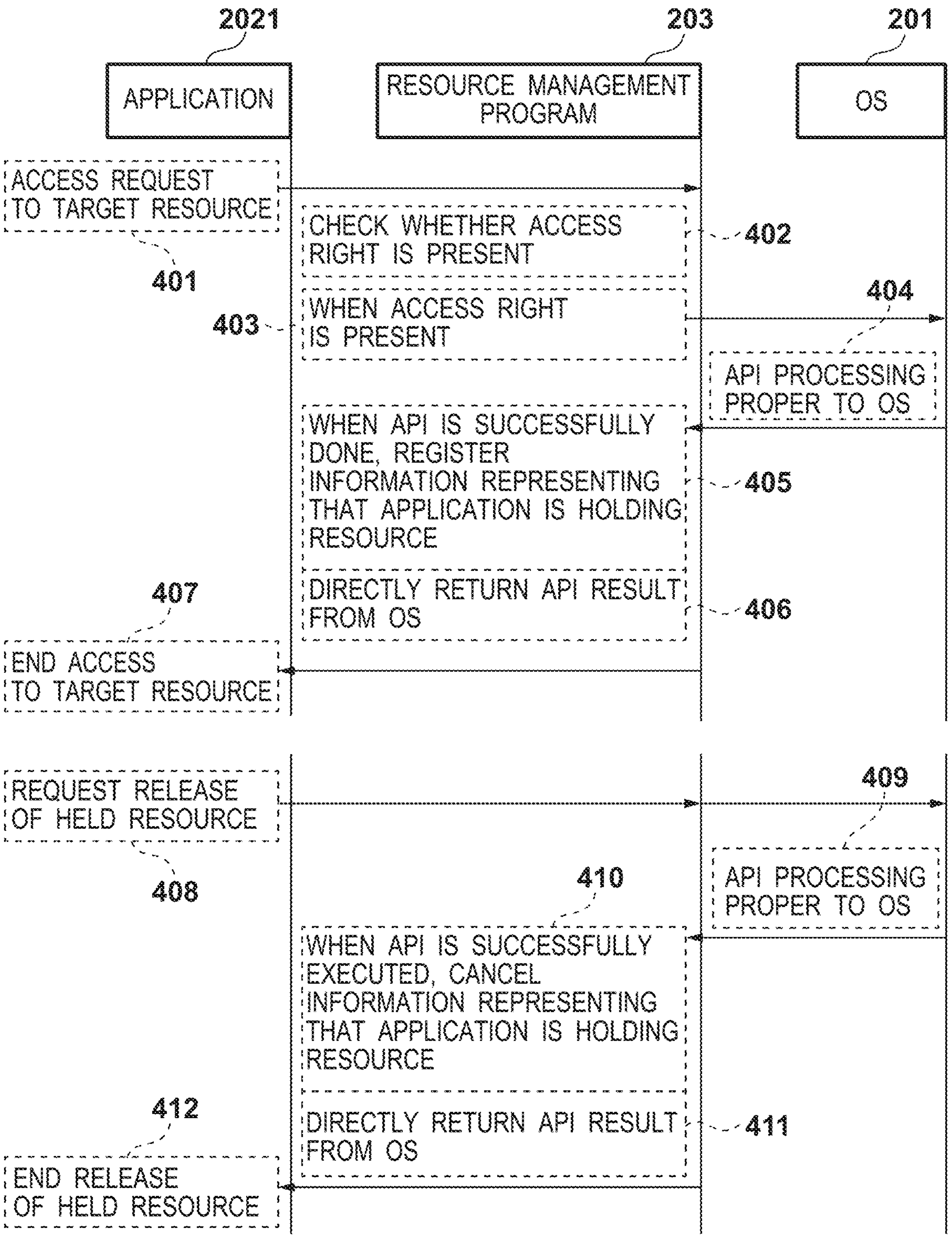
FIG. 4 is a sequence diagram illustrating a first base form of API monitor/control for facilitating description of the API capture technique according to an embodiment.

FIG. 4 is a sequence diagram of a first basic mode (1) for API monitoring and controlling which shows the exchanges between the application 2021, the resource management program 203, and the general-purpose OS 201 until the resource is released in a case where access privilege to the target resource exists.

In the first basic mode (1), in a case where an access request for a target resource exists via an API issued by the application 2021 (step 401), the resource management program 203 checks whether the application 2021 has the access privilege for the resource (step 402). In a case where the check result shows there is access privilege (step 403), the API issued by the application 2021 is sent as is to the general-purpose OS 201. The general-purpose OS 201 executes API processing belonging to the OS (step 404).

In a case where the API processing is successful, the resource management program 203 registers information indicating that the application 2021 is holding the resource (step 405). Then, the API result from the general-purpose OS 201 is sent back as is to the application 2021 (step 406). In this manner, access to the resource is completed (step 407).

Thereafter, in a case where a release request for a held resource is issued from the application 2021 (step 408), the resource management program 203 sends the release request to the general-purpose OS 201. The general-purpose OS 201 executes API processing belonging to the OS (step 409). In a case where the API processing is successful, the resource management program 203 removes information indicating that the application 2021 is holding the resource (step 410). Then, the API result from the general-purpose OS 201 is sent back as is to the application 2021 (step 411). In this manner, release of a held resource is complete (step 412).

Figure 5:
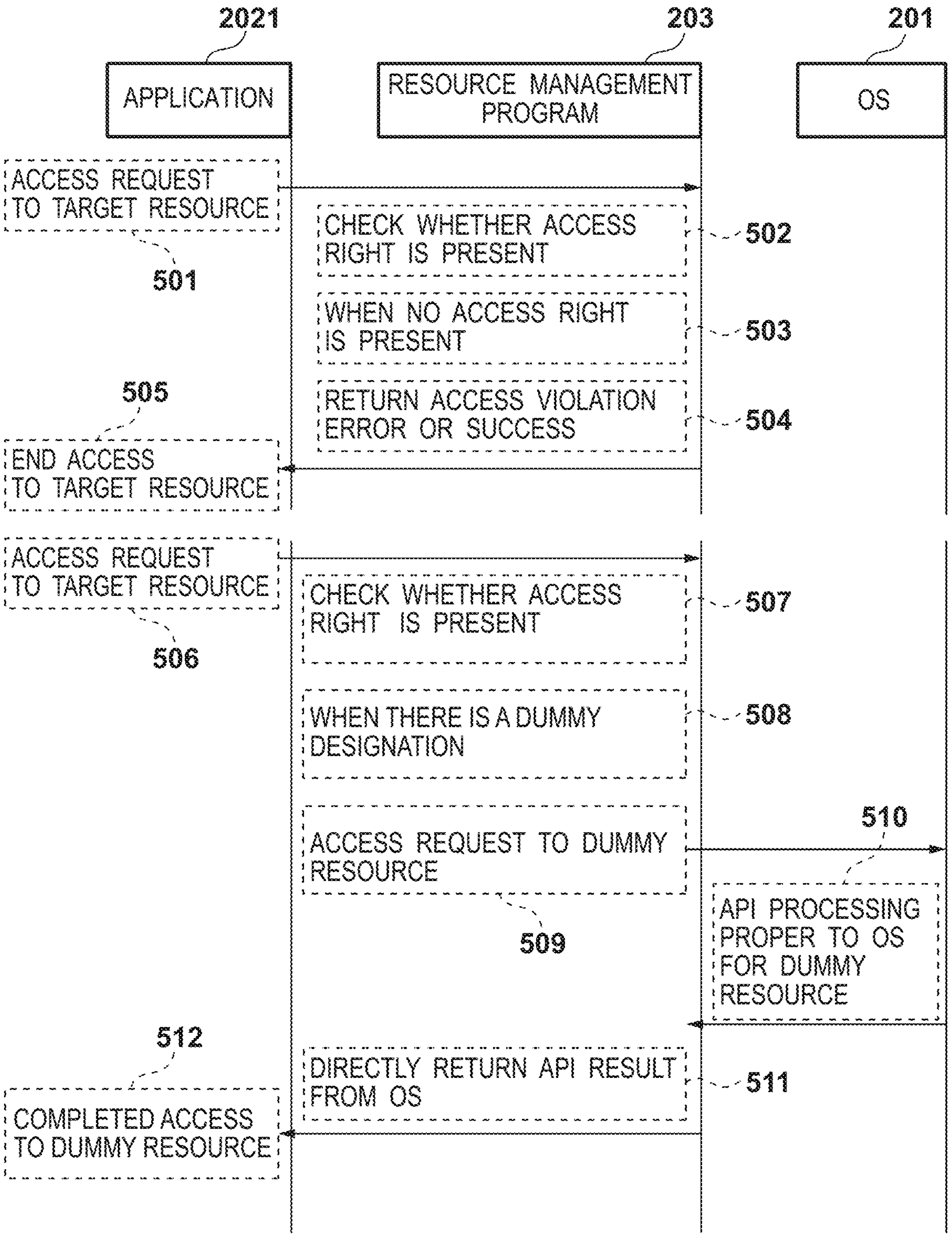
FIG. 5 is a sequence diagram illustrating a second base form of API monitor/control for facilitating description of the API capture technique according to an embodiment.

FIG. 5 is a sequence diagram of a second basic mode (2) for API monitoring and controlling which shows the exchanges between the application 2021, the resource management program 203, and the general-purpose OS 201 until access is denied in a case where access privilege to the target resource does not exist.

In the second basic mode (2), in a case where an access request for a target resource exists via an API issued by the application 2021 (step 501), the resource management program 203 checks whether the application 2021 has the access privilege for the resource (step 502). In a case where the check result shows no access privilege (step 503), an illegal access error is sent back to the application 2021 (step 504). In this manner, processing for access to a resource ends (step 505).

In a case where an access request for a target resource exists via an API issued by the application 2021 not responding to an illegal access error (step 506), the resource management program 203 checks whether the application 2021 has the access privilege for the resource (step 507). In a case where the check result shows no access privilege and the application 2021 is not responding to the illegal access error (step 508), the access request is replaced with an access request for a dummy resource prepared in advance by the resource management program 203, and this is sent to the general-purpose OS 201 (step 509).

The general-purpose OS 201 executes API processing belonging to the OS (step 510). The resource management program 203 sends the API processing result from the general-purpose OS 201 as is back to the application 2021 (step 511). As a result, processing for access to a target resource ends, but due to dummy resource, essentially nothing happens (step 512).

Note that a case where an illegal access error is sent back to the application 2021 and where the access request is replaced with an access request for a dummy resource prepared in advance, in a case where there is no access privilege, has been described above. However, the access request may be replaced so that another resource allowed to be accessed is accessed. Whether the replacement is with a dummy or another resource is specified in the access privilege management table 2035.

Summary of Separation Policy Application Technique

The separation policy application technique will be described below. To facilitate a more general description of the separation policy application technique, in the following example, the separation policy application technique is applied to a typical electronic device (for example, a PC). As described below, the separation policy application technique is also applied to a file server (or another network device) on the network, for example.

In the following example of the separation policy application, the resource management program 203 manages access requests for resources on the basis of the separation policies. The separation policies are information, where, for a plurality of types of tasks, policies (hereinafter, referred to as separation policies) are collectively defined for each task for access privileges required for each task.

A separation policy includes an application executable or not executable for the corresponding task, areas (such as a specific local disk or network disk) which are readable and writable or not readable and writable, allowed communication destinations (such as email or the Internet), target user, PC, time period, use location, and similar information.

The plurality of defined separation policies are manually switched by the user or automatically switched when a PC is used, and, when the PC is running, one of these separation policies is always applied to the resource management program 203.

For the OS or software running on a PC, the resource management program 203 performs control to allow an access request for a resource only in the range defined by the applied separation policy. In other words, control is performed to satisfy the separation policy by the resource management program 203 capturing the processing executed by the OS or software at the API level, processing violating the separation policy being prohibited, and only allowing processing that satisfies the separation policy to be executed. Alternatively, processing that violates the separation policy may be prohibited as well as being switched to a different processing that does satisfy the separation policy.

In “API capture” by the resource management program 203, the required capture is performed not only at the application level but also at a system level called the driver and service to implement separation equivalent to that of PCs being physically separated.

For example, to not allow access to the Internet, various known techniques such as denying access partway along the communication path can be implemented. However, with a physical separation, the PCs are able to be not even connected to such a network. On the other hand, in the present embodiment, using the resource management program 203, whether to allow access to a communication resource (for example, a network card or the like) for implementing communication with the network is determined at the API level inside the PC, and thus, when the access is denied, communications do not flow through the connected network. This is as effective as physical separation in relation to recent concerns such as the communication device itself being targeted with a cyber attack and the like.

Next, examples of items for setting allow or prohibit using a separation policy according to the present embodiment will be described.

First, the following are examples of separation policy control information. These may correspond to the resource specifying information in FIG. 3, for example.

(1) Execute or Not Program
The specification of whether each program is allowed to be executed or is prohibited is registered as a program name, a program path, or a program file hash.

(2) Reading Access (Connection) or Not Region
The region for specifying whether the reading of each type of information is allowed or prohibited is registered as a file path, URL, IP address, host name, USB device ID, email address, or wireless LAN AP.

(3) Writing Allowed or Not Region
The region for specifying whether writing is allowed or prohibited is registered as a file path, URL (POST/PUT command), USB device ID, email address (SMTP), or a data type such as clipboard. Allowing writing can be set to specify encrypted writing. The encryption key in this case is defined by the separation policy. As described above, by defining the encryption key for encrypted writing for each separation policy, only a separation policy with the same encryption key can read the information. Thus, the information that can be essentially referenced can be separated on a separation policy basis.

(4) Temporary Access Allowed Region

A region for specifying, at the timing of a change in the applied separation policy, logoff or not, end in-use program or not, a region to delete (path specification), and resume program in-use by separation policy after change.

The following are examples of separation policy application target information. These may correspond to the controllable conditions or the access privileges in FIG. 3.

(1) Applied Terminal (PC) Information

A machine name, IP address, and/or MAC address are registered.

(2) Applied User Information

A user name and/or group name are registered.

(3) Applied Position Information

Position information, connection AP, connection domain name, and/or a specific in-company PC obtained from the OS are registered.

(4) Applied Time Information (Time Information)

The time, time period, and/or day of application are registered.

Also, clear processing of the information of when switching to another separation policy is executed as follows.

(1) For the clipboard, "clear/restrict specific type/leave unchanged" is specified.

(2) For the temporary access allowed region, "clear/deny access until same policy is applied/leave unchanged" is specified.

The control information, application target information, and clear information described above are made a set to define one separation policy. Note that a plurality of separation policies can be defined by defining each name, and the plurality of separation policies are switched between via the separation policy switching mechanism and applied to the resource management program 203.

In a case where a separation policy is applied to the resource management program 203, the separation policy provided to the resource management program 203 is analyzed by the access control CTRL 2033 illustrated in FIG. 2 and applied to the access privilege management table 2035 by deploying the resource specifying information, access privilege information, and the like as illustrated in FIG. 3. Note that the separation policy switching mechanism may be configured to switch via a user selection or may be configured to automatically switch on the basis of location information (for example, at a company or at home) of where the PC is used.

FIGS. 6A and 6B are diagrams illustrating detailed examples of separation policies.

Examples of separation policies to be used at a company or the like include a confidential work separation policy, an in-company office work separation policy, a remote work at home separation policy, a business trip work separation policy, an unregistered location separation policy, a predetermined separation policy, and the like.

Specifically, with the confidential work separation policy, the PCs to which the separation policy is applied are restricted, the people who use them are restricted to certain management or development personnel, and the usable location and the like is also strictly restricted. Also, the resource management program 203 to which the confidential work separation policy is applied allows access to substantially all of the resources for access requests from the application 2021. For example, regarding usable programs, access is allowed to basically all of the programs, such as a schedule management application, a development application, a document creation application, and the like. Also, regarding the readable area, the writable area, and the like, an external HDD, the internal HDD, and other storage areas are basically all allowed to be used. Accordingly, the company's confidential information and the like can be accessed by only certain people, and the various types of tasks using the information can be freely performed. However, access to networks such as an intracompany network is allowed but access to networks such as the Internet is not allowed due to the nature of possibly dealing with confidential information.

With the in-company office work separation policy, compared to the confidential work separation policy, the range of people registered for office work at the company that can use a terminal is expanded, the location information which allows the use of the terminal is expanded. In this manner, by increasing the number of people or locations allowed for use, the security level is reduced. Thus, the resource management program 203 reduces the number of resources that can be accessed in the case of this separation policy being applied compared to the confidential work separation policy. For example, regarding usable programs, development applications are made not usable, and basically, access is allowed only to programs required for office work, such as schedule management applications, document creation applications, and the like. Also, regarding the readable area, the writable area, and the like, access to an external HDD is not allowed, and only access to the internal HDD is allowed. Also, access to networks such as an intracompany network and the Internet is allowed to allow for searching using the Internet. Alternatively, depending on the work, access may be allowed to the intracompany network, but communication via the Internet may be not allowed.

Also, with the remote work at home separation policy, the terminal to which the separation policy is applied is a mobile PC registered with the company, and the usable location is the home of a company employee registered with the company. In a case where the remote work separation policy is applied, the terminal references its GPS information and the registered address of the home of the employee and applies the separation policy to the resource management program 203. When remotely working from home, because the security level is lower than the security at the company, the usable programs are further restricted. For example, development applications, office work applications, and the like are unable to be used, and basically only programs required for working at home such as document creation applications are allowed to be accessed. Also, regarding the readable area, the writable area, and the like, access to an external HDD is not allowed, only reading from the internal HDD is allowed, and only storage prepared in the company are readable and writable. Also, for the Internet and intracompany storage to be used via an intracompany network, the network allows access only for a VPN (virtual private network) to connect to the intracompany network.

Also, with the business trip work separation policy, the terminal to which the separation policy is applied is a mobile PC registered with the company, and the usable location is the trip destination registered with the company. In a case where the business trip work separation policy is applied, the GPS information and the registered address of the trip destination are referenced and applied to the resource management program 203. Also, the usable programs are restricted to a greater extent than with working from home with only browsers and email being made usable. Also, the readable area is restricted to only the content of the carried USB memory, for example. Access to a network is also not allowed.

Also, in a case where a terminal registered with the company is trying to be used by an employee or another person at an unknown location such as an unregistered location, as the security state is unknown, the resource management program 203 prohibits access to all resources.

The predetermined separation policy is a separation policy preset to be used in a case where no applicable policy exists. With the predetermined separation policy, typical office work programs, document creation applications, email, and the like can be used. With the predetermined separation policy, it is assumed that the terminal is used at the company, and the work typically performed at the company is allowed. Also, as with the in-company office work separation policy, access to networks such as an intracompany network and the Internet is allowed to allow for searching using the Internet.

Next, a method for managing separation policies will be described.

(1) When the Separation Policy is Held as a File

Information of a "separation policy example" is stored in a separation policy file in an encrypted state or as is. The separation policy file may be stored in advance in the terminal PC to be used or stored in a management server with the latest policy being transferred to the terminal PC when a connection with the server is made. In a case where the separation policy file is managed by the management server, irrespective of the applied policy, the management server and the terminal PC are configured to be able to communicate with one another to allow for the separation policy to be received from the management server.

(2) When the Separation Policy is Dynamically Sent to the Terminal PC from the Management Server The terminal PC does not hold the actual policy file and stores the separation policy received from the management server in its memory for use. The data (PC name, user name, location) required for policy selection is transmitted to the server periodically or per specific event, and the server provides the terminal PC with the corresponding separation policy. At a timing when no policies exist, for example, after a restart, the "predetermined separation policy" described above is used.

(3) When the Predetermined Separation Policy is Used

The predetermined separation policy is a separation policy preset to be used in a case where no applicable policy exists, as described above. The predetermined separation policy may be stored as a file in a terminal or may be implemented as a specified value in a system. Normally, the predetermined separation policy is defined as restricted conditions such as the management server and the terminal PC being communicatively connected and a local disk being unable to be used.

Next, a method for switching separation policies such as those described above depending on the work will be described.

First, candidates of the separation policies to be applied at the start of use of a PC are those having application target information registered in a separation policy which matches with the PC use situation. Also, an order of priority can be defined for the separation policies on the basis of, of the application target information, the application terminal information, application user information, application position information, application time information, and similar types of information, and the applicable separation policy with the highest order of priority is made the candidate.

Take an example where, for the information type order of priority, it is defined that the application terminal information is high in the order and the application user information is low in the order. If a user B uses a terminal A, then out of the separation policy of the terminal A and the separation policy for the user B, the separation policy for the terminal A would be made the candidate.

Also, an application order of priority can be defined for separation policies belonging to the same information type or the same order of priority can be defined. In a case where there are still a plurality of candidates after restriction using the information type order of priority, selection is made according to the priority order of the separation policies.

In a case where the result of restricting the separation policy candidates in this manner produces a plurality of separation policy candidates, the user can select any one from these. If the user does not select one, the first separation policy compatible inside the PC is applied.

Figure 7:
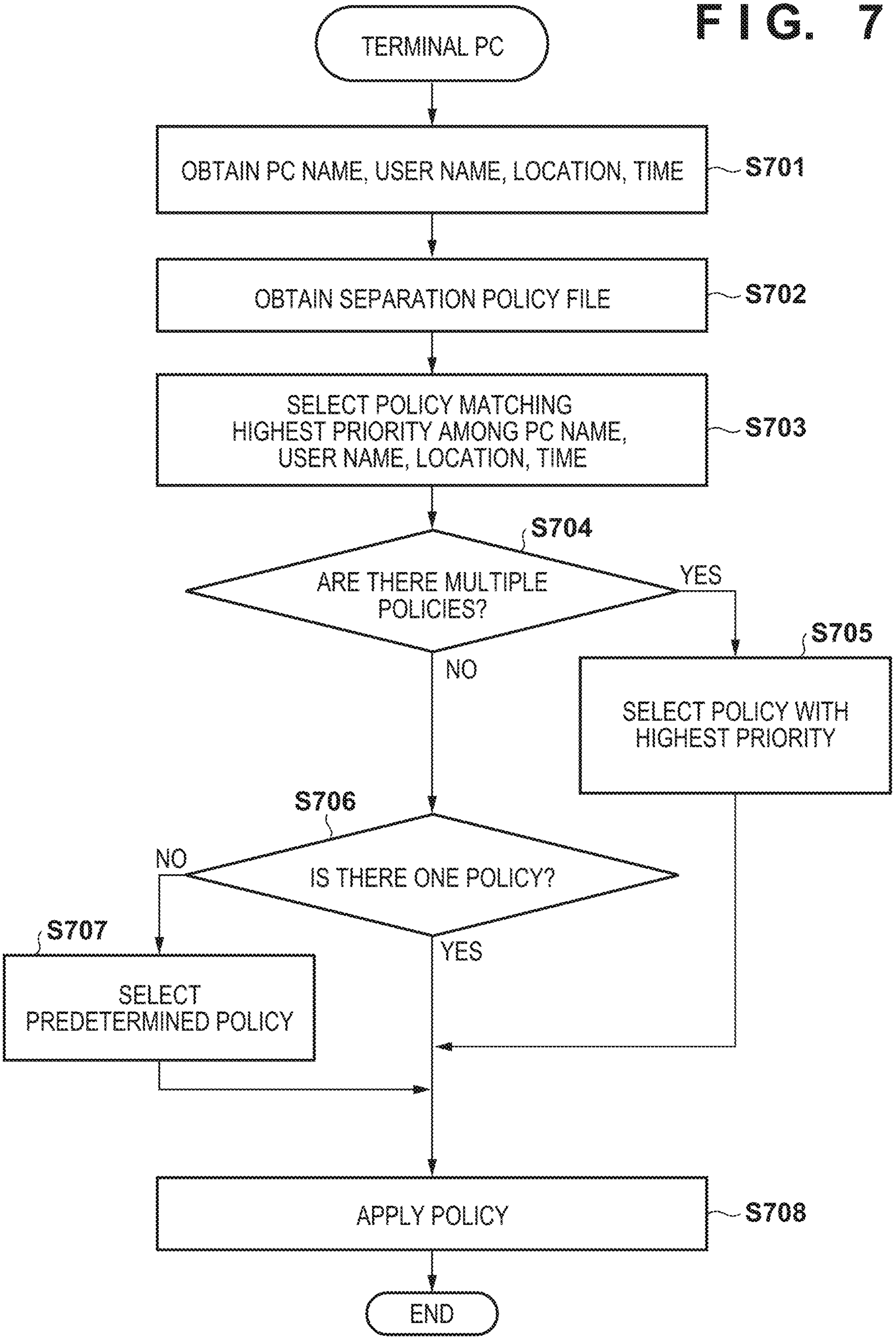
FIG. 7 is a diagram illustrating the operations of a terminal PC for selecting a separation policy according to an embodiment of the present invention.

FIG. 7 is a flowchart illustrating the operations when a terminal PC selects a separation policy. The operations of the flowchart in FIG. 7 are started when the terminal PC is started up. Note that the terminal PC may be the terminal PC illustrated in FIG. 1B, and the operations of the present flowchart may be implemented by the CPU 1210 loading and executing a program stored in the storage unit 1207.

In step S701, the CPU 1210 of the terminal PC obtains the information of its PC name, a user name, a use location, and the time.

In step S702, the CPU 1210 of the terminal PC obtains the separation policy file stored in its hard disk or the like.

In step S703, the CPU 1210 of the terminal PC selects the separation policy that matches with the application target information with the highest order of priority from among the application target information including PC name, user name, use location, time, and the like.

In step S704, the CPU 1210 of the terminal PC determines whether or not there are a plurality of policies corresponding to the application target information with the highest priority selected in step S703. In a case where there is a plurality, the flow proceeds to step S705. Otherwise, the flow proceeds to step S706.

In step S705, the CPU 1210 of the terminal PC selects the separation policy with the preset highest order of priority from among the plurality of separation policy candidates.

In step S706, the CPU 1210 of the terminal PC determines whether or not there is one separation policy. In a case where there is one separation policy, the flow proceeds to step S708. In a case where there are no separation policies, the flow proceeds to step S707.

In step S707, the CPU 1210 of the terminal PC selects the predetermined separation policy.

In step S708, the separation policy selected in one of the steps S705 to S707 is applied to the resource management program 203.

Note that as described above, in step S706, the separation policy with the preset highest order of priority from among the plurality of separation policy candidates is selected. However, the user may perform the selection.

Figure 8:
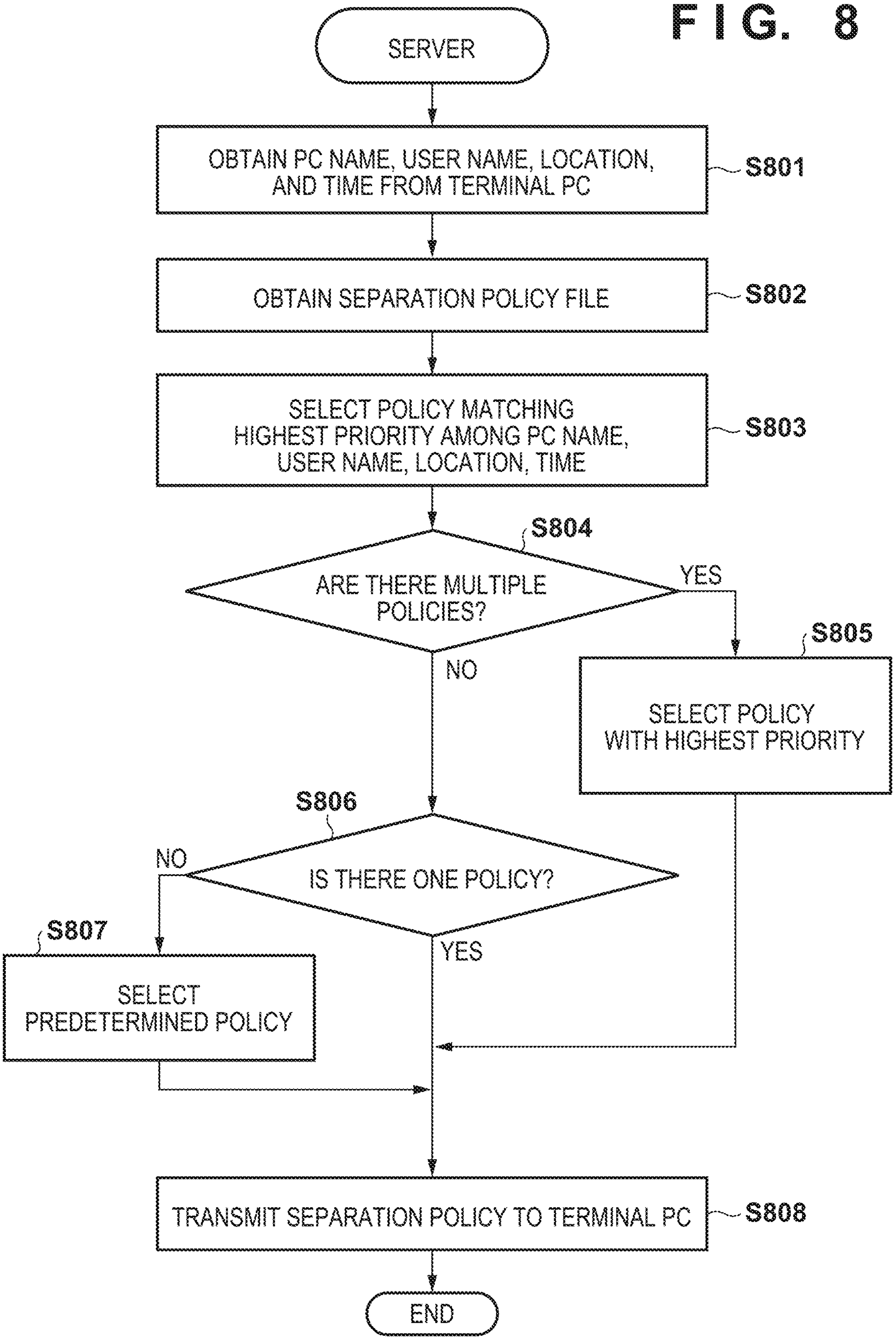
FIG. 8 is a diagram illustrating the operations of a server for selecting a separation policy according to an embodiment of the present invention.

FIG. 8 is a flowchart illustrating the operations for the management server that manages the separation policies to select a separation policy when separation policies are provided to the terminal PC from the management server. The operations of the flowchart in FIG. 8 are started when the management server receives a transmission request for a separation policy from the terminal PC. Note that the management server may be the management server illustrated in FIG. 10. The hardware configuration of the management server may be substantially the same as the hardware configuration of the server illustrated in FIG. 1C (namely, the communication circuit, the CPU, the RAM, the storage device, and the like).

In step S801, the CPU of the management server obtains the information of a PC name, a user name, a use location, and the time from the terminal PC.

In step S802, the CPU of the management server obtains the separation policy file stored in its hard disk or the like.

In step S803, the CPU of the management server selects the separation policy that matches with the application target information with the highest order of priority from among the application target information including PC name, user name, use location, time, and the like received from the terminal PC.

In step S804, the CPU of the management server determines whether or not there are a plurality of policies corresponding to the application target information with the highest priority selected in step S803. In a case where there is a plurality, the flow proceeds to step S805. Otherwise, the flow proceeds to step S806.

In step S805, the CPU of the management server selects the separation policy with the preset highest order of priority from among the plurality of separation policy candidates.

In step S806, the CPU of the management server determines whether or not there is one separation policy. In a case where there is one separation policy, the flow proceeds to step S808. In a case where there are no separation policies, the flow proceeds to step S807.

In step S807, the CPU of the management server selects the predetermined separation policy.

In step S808, the CPU of the management server transmits the separation policy selected in one of the steps S805 to S807 to the terminal PC.

Note that as described above, in step S805, the separation policy with the preset highest order of priority from among the plurality of separation policy candidates is selected. However, the plurality of separation policy candidates may be transmitted to the terminal PC as is, so the user may select the separation policy to be applied on the terminal PC.

In the examples described above, what separation policy is selected is determined when the terminal is started up. However, the processing described above may be executed to change the separation policy as appropriate at timing such as when the user information is changed such as when logging in or when switching users, when the registered position information is confirmed or changed, when the date and time obtained from the OS is changed, and the like. Also, each time, the operations of the OS when using the PC and all of the programs are controlled according to the separation policy selected and applied by the selection method described above.

Network Resource Separation

Next, network resource separation according to the present embodiment will be described. In network resource separation, the API capture and separation policy are applied to a network resource (for example, a file server, a gateway machine, or a proxy server) to separate the access target. Note that the access control of the network resource may be performed using a known access control technique implement for each network resource instead using the API capture described above as long as the access control according to the separation policy according to the present embodiment can be performed.

Separation policies that enables separation of the network resource will now be described with reference to FIGS. 9A, 9B-1, and 9B-2. The separation policies that enables separation of the network resource are expansions of the separation policies described with reference to FIGS. 6A and 6B. The separation policies are each provided with a unique separation policy name (in other words, information for identifying the separation policy). Also, as will be described below with reference to FIGS. 9B-1 and 9B-2, the separation policies for separating the network resource include network resource control information in addition to the separation policy control information and application target information illustrated in FIGS. 6A and 6B.

As with the separation policies described above that separate the network resource, regarding the network resource, the separation policy provided to the resource management program 203 is analyzed by the access control CTRL 2033 illustrated in FIG. 2 and applied to the access privilege management table 2035 by deploying the resource specifying information, access privilege information, and the like as illustrated in FIG. 3.

FIG. 9A is an example of environments implemented by separation policies that enables separation of the network resource. The “for in-company confidential task A” and “for in-company confidential task B” illustrated in FIG. 9A are examples of the separation policy “for in-company confidential task” illustrated in FIGS. 6A and 6B expanded into individual work policies with different access destinations for each task. In the “for in-company confidential task A” and “for in-company confidential task B”, the data regions that (apparently) exist in the file server are different. The separation policies “watermark printing”, “cloud restriction”, “cloud restriction (application restriction)” illustrated in FIG. 9A are new examples that do not directly correspond to the examples illustrated in FIGS. 6A and 6B.

As illustrated in FIG. 9B-1, the separation policies for separating the network resource each include separation policy control information, application target information, and network resource control information. As described above, the control information includes a usable program, a readable area, and a writable area and temporarily access information. The example illustrated in FIG. 9B-1 will not be described in detail as it is similar to that of FIG. 6A. The separation policy application target information indicates the target (for example, a PC) that can access a network resource. The separation policy application target information includes terminal information, user information, position information, and time information as in the configuration described with reference to FIGS. 6A and 6B. In other words, the “terminal information” may be designated by at least one of the machine name, IP address, and MAC address, for example. The “user information” can designated by the user name or group name. The “position information” may include at least one of the position information, connection AP, connection domain name, identifier indicating a specific in-company machine, and the like obtained from the OS of a PC used by a user. Also, the “time information” can be designated by a date and time period or a day/s in which a separation policy is applied and use of the PC is allowed.

The network resource control information includes information of at least one of the IP address, host name, URL, directory path of the file server, network device name (printer, scanner, or the like) for the network resource targeted for access control (to allow or prohibit). In the example illustrated in FIG. 9B-2, the IP address and host name, the in-server directory path, and the URL are included, for example. The “IP address and host name” designates the IP address and host name of the network resource to allow or prohibit access to. The “in-server directory path” designates the resource to allow or prohibit access to in a file server or a remote device. In the example illustrated in FIG. 9B-2, in the separation policies "for in-company confidential task A" and "for in-company confidential task B", access to only the work-dedicated data region of each file server is allowed. The "URL" designates the URL of the web service to allow or prohibit access to.

Also, with the network resource control information, these pieces of information may be designated in combination with an application program for access. For example, a program for allowing or prohibiting access to a network resource may be designated using at least one of a program name, program path, and a program file hash. In the example illustrated in FIG. 9B-2, with the separation policy "cloud restriction (application restriction)", the programs "teams.exe." and "edge.exe" for access are designated. The programs for access are discerned via API capture control processing for capturing an API.

Note that the information constituting the application target and the information constituting the network resource control information can be used, as necessary, as individual separation policies omitted or masked depending on their role (PC, gateway, file server, or the like). In this case, when applying an individual separation policy to a PC or a file server, they may be linked by the separation policy name or a separation policy identifier ID.

As described using FIG. 7, in the separation of the network resource, a plurality of separation policies may be automatically switched between (to satisfy providing target information), or the separation policies may be switched between when a user uses a PC within a range that satisfies the application target information. By switching the separation policies, when the user operates the PC, the PC is in a state with one of the separation policies applied at all times.

With a configuration in which a network resource such as a file server is accessed by the PC, the resource management program described above that executes access control according to the separation policy may also run on one or more network resources such as a gateway, a proxy, a file server, and the like. In a case where the PC attempts to access a network resource, the resource management program existing on the network resource identifies the current separation policy of the PC which is the access source and executes access control according to, of the separation policies in the resource management program, the policy name and the policy details of the same name applied to the PC. In a case where the separation policy applied to the PC is changed, the PC may transmit the post-change separation policy name (information for identifying the separation policy) to the network resource (file server or proxy) to link the separation policy applied by the network resource to the separation policy applied by the PC. Note that in both the PC and the network resource, API capture can be executed by each resource management program applies a separation policy of the same separation policy name. In this manner, both the PC and the network resource are linked and separated by the applied separation policy, allowing for strong security to be ensured. On the PC side, the name of the separation policy name to be applied may be obtained but the API capture not executed. In other words, API capture with a separation policy (corresponding to the separation policy name obtained by the PC) applied only to the file server and the gateway of the network resource side may be executed. In this case, from the PC, these network resources are appropriately controlled relating to separation according to the separation policy, but there is no need to execute special control such as API capture on the PC side. Thus, the implementation on the PC side is simplified, and the operations of the PC are sped up. Also, in a case where one or more gateways exist on the path a file server is accessed from a plurality of PCs, API capture according to the separation policy may be executed only for the one or more gateways on one or more paths. In this case, since API capture is not executed at the PC and the file server, there is no need for special control at the PC and the file server. However, by the one or more gateway executing access control according to the separation policy (corresponding to the separation policy name obtained by the PC), network separation that is simple and has high security can be implemented.

Regarding the separation policies for separating the network resource, the information of the separation policies described above may be stored in a file format (separation policy file), for example. The separation policy file may be encrypted. The separation policy file may be stored in advance in the PC and the network resource.

Also, a management server for managing the contents of the separation policies may be provided, and the separation policies may be distributed from the management server. Furthermore, in the separation policies held by the PC, only the application target information may be included, and in the separation policies held by the network resource, only the network resource control information may be included. With such a configuration, there may be cases where the management of the network resource control is made easier, such as when the policy contents are changed in conjunction with a change to the network configuration. In a case where the separation policies are exchanged between apparatuses, an exchange of separation policies is performed after authentication is performed between both devices. The exchanged separation policies and other exchanged data may be encrypted.

In a case where a management server is used, the PC and the network resource may access the management server periodically or indeterminately, and the separation policies of each device may be changed by obtaining the latest separation policy file. Note that in a case where the separation policies used by the PC and the network resource are managed by a management server, the PC and the network resource may be configured to be able to access the management server to obtain a separation policy file regardless of the set contents of the separation policy.

In an example of a separation policy, separation policy information is dynamically provided to the PC and the network resource by the management server. In this case, the PC and the network resource store the separation policy information received from the management server in the memory or storage unit in the device for use. At a timing when no separation policy information exists, for example, after a restart, the "predetermined separation policy" described below may be used.

At a timing such as just after activating the PC or when switching the separation policy, the PC (and the network resource) may use a predetermined specific separation policy (also referred to as the default separation policy). The default separation policy is a default separation policy tentatively used in a case where no applicable separation policy exists, for example. The control unit in the network resource may apply the separation policy as a default value in the case of applying a separation policy where the access source does not have an applicable policy or it does not exist. The default separation policy may be defined by the contents of the policy at maximum restriction. The policy at maximum restriction may include, for example, allowing communication only with the management server, prohibiting access to all of the network resources, or the like.

Figure 10:
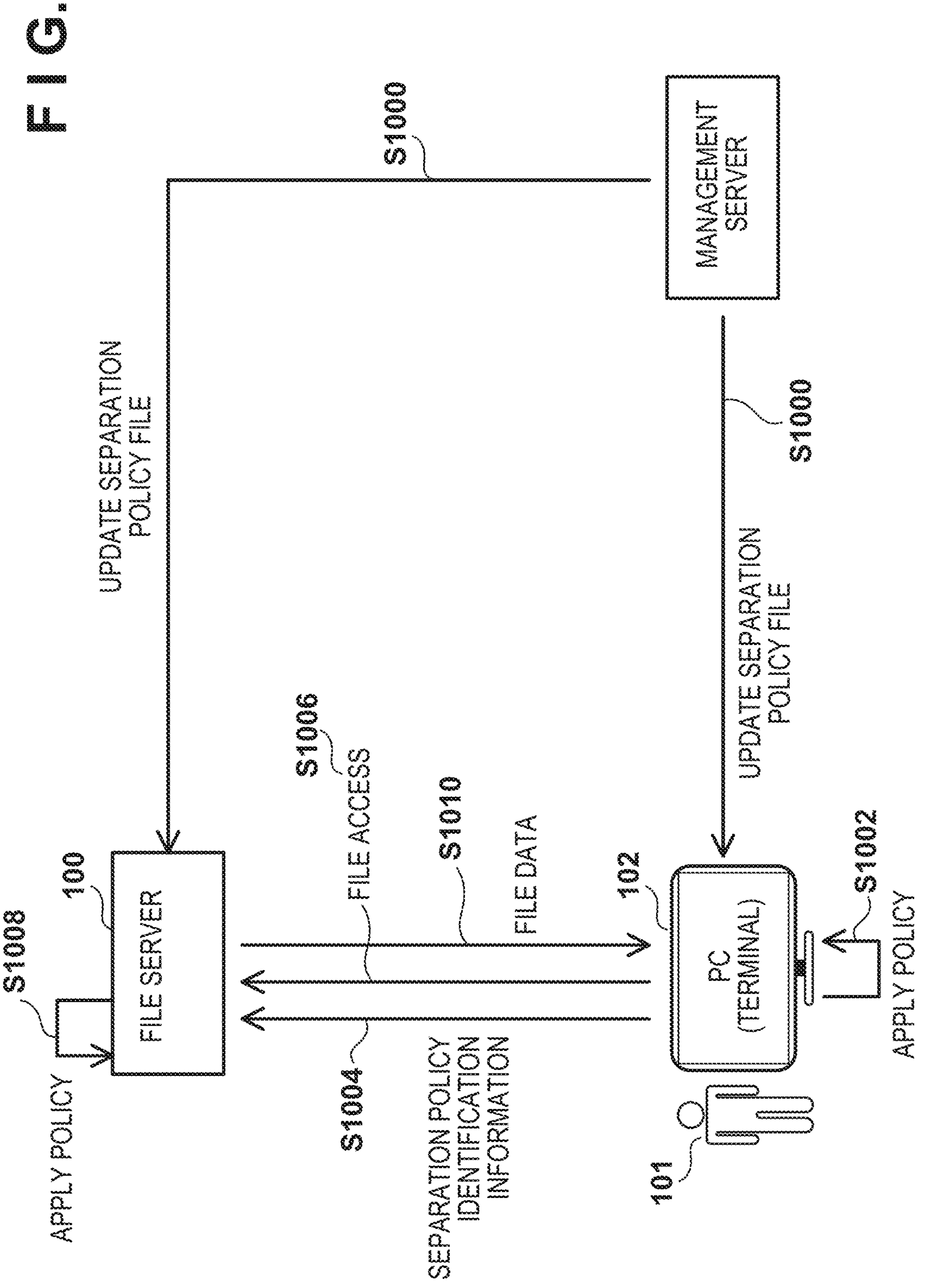
FIG. 10 is a diagram for describing operation examples of applying a separation policy to a PC and a file server according to an embodiment of the present invention.

FIG. 10 schematically illustrates a configuration in which the PC 102 and a file server 100 are disposed inside a company, with the PC 102 accessing file data of the file server 100 according to a separation policy. In this example, the file of the separation policy (for separating network resources) is pre-stored in the storage unit of the PC 102 and the file server 100. Also, the file of the separation policy stored by the PC 102 and the file server 100 may be pre-distributed and updated by the management server (S1000). When the user 101 starts using the PC 102, for example, the separation policy is applied by the processing of the PC 102 illustrated in FIG. 7 (S1002). For example, at this time, the separation policy "for in-company confidential task A" may be applied to the PC 102. The PC 102 transmits identification information (in other words, the separation policy name) of the separation policy applied to the PC 102 to the file server 100 (S1004). Note that obtaining the identification information of the separation policy may be performed after there is a file access from the PC 102 as described regarding the operations of the access control in the file server described below.

When the file server 100 receives a file access (in other words, an access request) from the PC 102 (S1006), the file server 100 identifies (applies) the separation policy (for example, "for in-company confidential task A") corresponding to the obtained identification information of the separation policy, and the resource management program of the file server 100 executes access control according to the separation policy (S1008). If it is access to a data region allowed in the separation policy, the file server 100 transmits the requested file data to the PC 102 (S1010).

The resource management program of the file server 100 checks the contents of the current separation policy with the terminal at the timing of when there is access from the PC 102 (when the control information is registered in combination with the program, the program of the access source also checks). Then, access is allowed or denied according to the separation policy in the API capture control processing. In this manner, detailed network resource control such as control of access to a directory in the file server can be performed. Note that in the case of a protocol with "establish connection" processing such as TCP/UDP and access with "open" processing such as file access, control can be executed on the processing and omitted for the subsequent processing.

In the example illustrated in FIG. 10 described above, the management server distributes the separation policy information to the PC and the file server, and the separation policy information is stored in each storage unit. However, the separation policy distribution and separation policy selection are not limited thereto. As illustrated in FIG. 8, the application of the separation policy in the PC 102 may be determined by the management server, and the name of the determined separation policy may be transmitted to the PC 102. In this case, for example, the corresponding separation policy information (for example, the network resource control information) to be applied to the file server 100 may be transmitted from the management server to the file server 100. In this case, the file server 100 may transmit information for identifying the access source (for example, information for identifying the PC) to obtain the corresponding separation policy information. Furthermore, in a case where one or more gateway machines are placed along the access path from the PC to the file server 100 as a network configuration, the file server 100 may obtain the separation policy identification information from the gateway machine. Also, the file server 100 may obtain the information (for example, the network resource control information) of the separation policy corresponding to the identification information from the management server.

Also, in a case where one or more gateway machines are placed along the access path from the PC to the file server 100 as a network configuration, a separation policy is not required in a subsequent network resource, and the gateway machine may transmit the separation policy information to the file server 100, for example. This makes policy management easier. Note that in a case where only a URL that can access via a proxy server is controlled, an existing simple control technique (such as a proxy program, gateway program, or the like) may be used for access control.

In this manner, with a network resource in a network, the current separation policy to be applied to the PC corresponding to the access source is linked, and access control can be implemented that is restricted on a network resource that can access as defined by the separation policy. In this manner, as a result, a network resource that can be accessed from the same terminal and is usable can be separated on demand as necessary (like a separated network resource).

Access Control Processing in File Server

Figure 11:
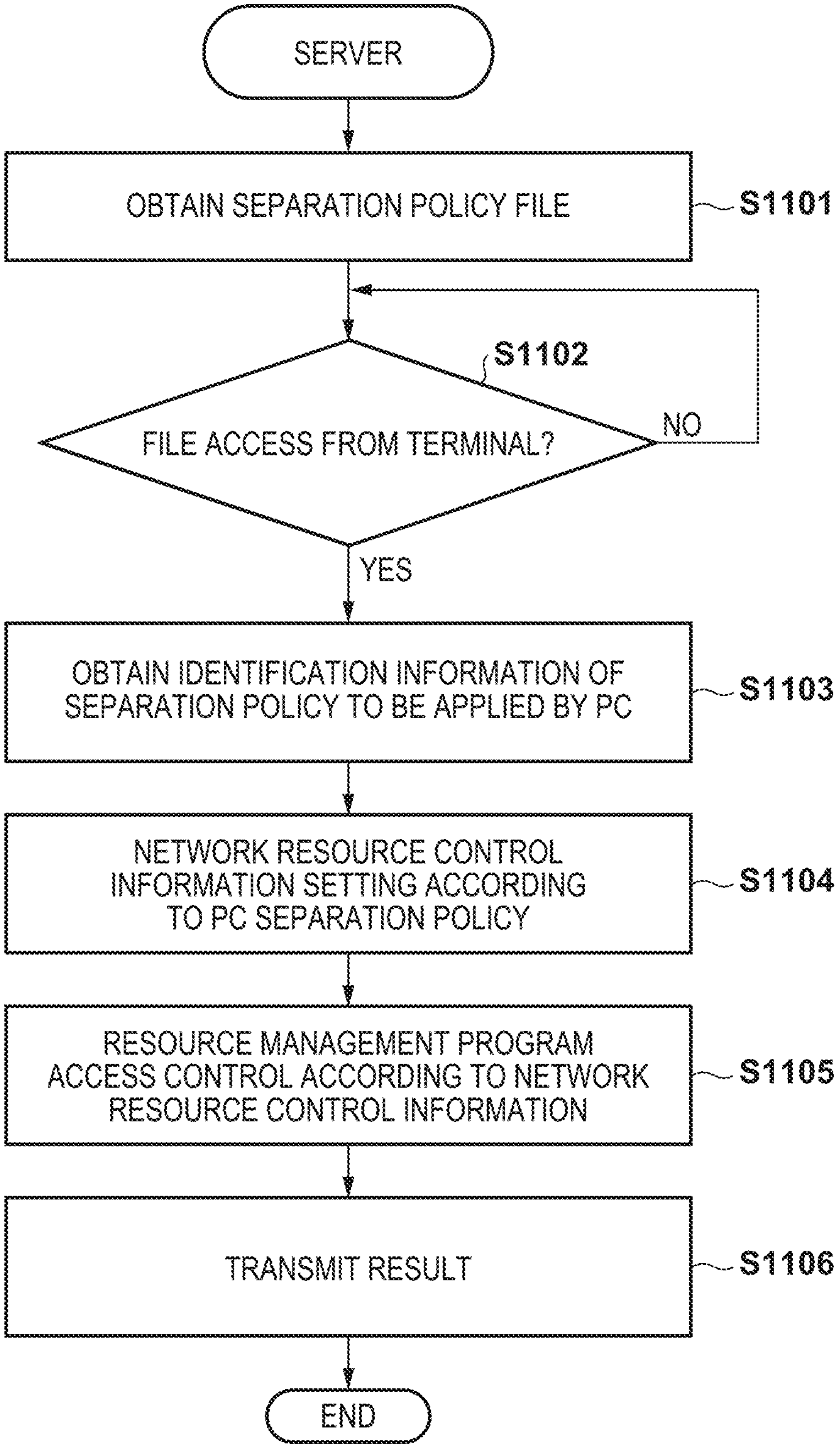
FIG. 11 is a diagram illustrating operations of the file server executing access control processing according to an embodiment of the present invention.

Next, processing for executing access control according to a separation policy in the file server 100, which is a network resource, will be described with reference to FIG. 11. The operations of the present flowchart may be implemented by the CPU 1310 loading and executing a program stored in the storage unit 1304. Here, a portion or all of the present processing executed by the CPU 1310 is implemented by the resource management program described above running by the CPU 1310 executing the program. Note that in the operation examples described below, the timing of when the identification information of the separation policy applied to the PC 102 is transmitted to the file server 100 by the PC 102 is different from the timing as described using FIG. 10. However, the timing of when the identification information of the separation policy applied to the PC 102 is transmitted may be the timing illustrated in FIG. 10.

In S1101, the CPU 1310 of the file server 100 obtains the separation policy file from the management server, for example. Note that the file server 100 is not required to obtain the separation policy file from the management server in advance. The contents of the separation policy may be obtained from the PC in advance, and when the PC accesses the file server 100, the file server 100 may obtain the contents of the separation policy from the management server.

In S1102, the CPU 1310 determines whether there has been an access request for a file from the PC 102. Here, the CPU 1310 may obtain this together with information relating to the application target (terminal information, user information, position information, and time information). When there has been an access for the file from the PC 102, the CPU 1310 proceeds the processing to S1103. Otherwise, the processing proceeds to S1102.

In S1103, the CPU 1310 obtains the identification information of the separation policy to be applied by the PC 102. In S1104, the CPU 1310, according to the obtained identification information of the separation policy, extracts the network resource control information of the separation policy file and set this as information (the resource designating information, condition, or access privileges illustrated in FIG. 3, for example) to be used in access control.

The CPU 1310 may set the application target information of the separation policy file also as the information to be used for access control.

In S1105, the CPU 1310 executes access control via the resource management program using API capture according to the network resource control information set as the information to be used for access control. Here, in S1104, in a case where the application target information of the separation policy file is set, access control is executed also according to the application target information.

In S1106, the CPU 1310 transmits the result (transmits the accessed file to the PC 102, for example) according to the result of the access control from the resource management program. When the CPU 1310 transmits the result, the present processing ends.

Note that in the example described above, access request for a file which is a computer resource on the file server 100 from the PC 102 is executed. However, the same applies to an example where a network device is accessed from the PC 102 (an example where an Internet access request to a proxy is executed, for example). In other words, the proxy is applied to the separation policy, and access control of a computer resource (for example, a port, an established connection, a tunnel, or the like) on a proxy is executed according to the separation policy.

As described above, in the embodiments described above, access control via API capture according to a separation policy may be linked to a PC used by a user on a network resource (for example, a file server or a network device) and executed. In this manner, an environment in which the PC and the network resource side are physically separated per task can be imitated. Also, since the PC and the network resource are linked and operating using the same separation policy, the network environment itself can imitate physically separated individual environments. In other words, access control that is expanded according to the use status of a worker for network resources that can be used by the worker, while using an existing OS or process of a terminal or a device on a network can be implemented.

The invention is not limited to the foregoing embodiments, and various variations/changes are possible within the spirit of the invention.

What is claimed is:

1. An information processing method for controlling access to a computer resource on a network resource from a communication apparatus used by a user, comprising:

selecting a policy suitable for a state of the communication apparatus from a plurality of policies with access privilege allowed for each one of a plurality of types of work defined as a policy for each work; and in the communication apparatus, capturing an operation request, via API (Application Programming Interface), from a process or an operating system in the communication apparatus for a computer resource on the communication apparatus before the computer resource on the communication apparatus is accessed;

determining whether or not there is access privilege for the computer resource on the communication apparatus specified by the operation request captured in the communication apparatus, on a basis of information of the policy selected; and in the network resource, obtaining information of a policy selected for the communication apparatus;

capturing an operation request, via API, from a process or an operating system in the network resource for the computer resource on the network resource before the computer resource is accessed, in a case where an access request for a computer resource on the network resource is received from the communication apparatus;

determining whether or not there is access privilege for a computer resource specified by the operation request captured in the network resource, on a basis of information of the policy obtained in the obtaining step;

executing processing to send the operation request as is to an operating system if a result of the determining is that there is an access privilege and send the result back to a request source; and denying access to the computer resource specified by the operation request if a result of the determining is that there is no access privilege, wherein the determining in the communication apparatus and the determining in the network resource perform different access controls on a basis of the information of the policy selected.

2. The information processing method according to claim 1, wherein in the obtaining, after information for identifying the policy selected for the communication apparatus is received from the communication apparatus, information of a policy selected for the communication apparatus corresponding to the information for identifying the policy is obtained.

3. The information processing method according to claim 2, wherein in the obtaining, information of a policy selected for the communication apparatus corresponding to the information for identifying the policy is obtained from a file stored in a storage unit of the network resource.

4. The information processing method according to claim 2, wherein in the obtaining, information of a policy selected for the communication apparatus corresponding to the information for identifying the policy is obtained from an external management server.

5. The information processing method according to claim 1, wherein in the obtaining, after information for identifying the policy selected for the communication apparatus is received from another network resource, information of a policy selected for the communication apparatus corresponding to the information for identifying the policy is obtained.

6. The information processing method according to claim 1, wherein in the obtaining, information of a policy selected for the communication apparatus is obtained from the communication apparatus.

7. The information processing method according to claim 1, further comprising:

in a second network resource, which is a network resource accessed from the communication apparatus, obtaining information of a policy selected for the communication apparatus;

capturing an operation request, via API, from a process or an operating system in the second network resource for a computer resource of the second network resource before the computer resource is accessed; and determining whether or not there is access privilege for a computer resource specified by the operation request on a basis of information of the policy.

8. The information processing method according to claim 1, wherein the plurality of policies include, in each policy, information of at least an IP address, a host name, a URL, a directory path of a file server, and a network device name for a network resource targeted for access control, and in the determining, whether or not there is an access privilege for a computer resource designated by the operation request captured on a basis of the information of the network resource included in each policy.

9. The information processing method according to claim 8, wherein the plurality of policies further include, in each policy, information that designate a program that runs on the communication apparatus for accessing a network resource targeted for access control, and in the determining, whether or not there is an access privilege for a computer resource designated by the operation request captured is determined also on a basis of the information that designates the program included in each policy.

10. The information processing method according to claim 8, wherein the plurality of policies further include, in each policy, application target information that designates at least one of information of the communication apparatus, user information, position information of the communication apparatus, and time information used by the communication apparatus.

11. The information processing method according to claim 1, wherein the state of the communication apparatus includes applicable communication apparatus information, user information, communication apparatus position information, and time information.

12. The information processing method according to claim 1, wherein at least the capturing in the network resource is performed by a resource management program interposed between an application and an operating system of the network resource, and wherein the resource management program substitutes an entrance of API processing provided by the operating system with a monitoring routine such that the monitoring routine is invoked when the API is used.

13. A non-transitory computer-readable storage medium storing one or more programs for causing one or more computers to execute an information processing method for controlling access to a computer resource on a network resource from a communication apparatus used by a user, the information processing method comprising:

selecting a policy suitable for a state of the communication apparatus from a plurality of policies with access privilege allowed for each one of a plurality of types of work defined as a policy for each work; and in the communication apparatus, capturing an operation request, via API (Application Programming Interface), from a process or an operating system in the communication apparatus for a computer resource on the communication apparatus before the computer resource on the communication apparatus is accessed;

determining whether or not there is access privilege for the computer resource on the communication apparatus specified by the operation request captured in the communication apparatus, on a basis of information of the policy selected; and in the network resource, obtaining information of a policy selected for the communication apparatus;

capturing an operation request, via API, from a process or an operating system in the network resource for the computer resource on the network resource before the computer resource is accessed, in a case where an access request for a computer resource on the network resource is received from the communication apparatus;

determining whether or not there is access privilege for a computer resource specified by the operation request captured in the network resource, on a basis of information of the policy obtained in the obtaining step;

executing processing to send the operation request as is to an operating system if a result of the determining is that there is an access privilege and send the result back to a request source; and denying access to the computer resource specified by the operation request if a result of the determining is that there is no access privilege, wherein the determining in the communication apparatus and the determining in the network resource perform different access controls on a basis of the information of the policy selected.

* * * * *